United States Patent [19]
Moriyasu

[11] Patent Number: 5,738,321
[45] Date of Patent: Apr. 14, 1998

[54] MAGNETIC RECORDING AND REPRODUCING DEVICE

[75] Inventor: Yoshitada Moriyasu, Katano, Japan

[73] Assignee: Matsushita Electric Industrial Co., Ltd., Japan

[21] Appl. No.: 639,608

[22] Filed: Apr. 29, 1996

[30] Foreign Application Priority Data

May 8, 1995 [JP] Japan ................................. 7-109283

[51] Int. Cl.$^6$ ................................. E04G 3/00
[52] U.S. Cl. ................. 248/274.1; 396/422; 348/373
[58] Field of Search .............. 248/274.1, 276.1, 248/279.1, 282.1, 289.11; 396/422; 358/909.1, 906; 348/373, 374, 375, 376

[56] References Cited

U.S. PATENT DOCUMENTS 5,592,224 1/1997 Shim ........................ 348/373

Primary Examiner—Ramon O. Ramirez
Assistant Examiner—Willie Berry, Jr.
Attorney, Agent, or Firm—Parkhurst & Wendel

[57] ABSTRACT

A magnetic recording and reproducing device wherein a casing for a monitor image section is attached to a casing for a VTR section through a rotatable shaft mechanism. The device comprises a support shaft member and a rotatable member which do not require strict dimensional accuracy, and coil springs and shafts. The rotatable member is turnable relative to the support shaft member attached to the first casing. The support shaft member and rotatable member can be manufactured as inexpensive moldings. The support shaft member and rotatable member are centrally hollowed to allow a wire, which is used for electrical connection between the VTR section and the monitor image section, to be packaged such that it is drawn from the second casing through the hollow portions of the rotatable member and support shaft member into the first casing. Therefore, there is no possibility of the wire being nipped between the first and second casings during the operation of assembling the first and second casings, resulting in increased operating efficiency and facilitating the packaging operation of the wire. Since the wire is passed in the vicinity of the axis of rotation, a rotatable shaft mechanism of increased reliability with less metal fatigue of the wire can be realized.

5 Claims, 5 Drawing Sheets

MAGNETIC RECORDING AND REPRODUCING DEVICE

FIELD OF THE INVENTION

The present invention relates to a magnetic recording and reproducing device wherein the casing of a monitor image section is attached to the casing of a VTR section through a rotatable shaft mechanism.

BACKGROUND OF THE INVENTION

In a magnetic recording and reproducing device (video camera) wherein the casing of a monitor image section is attached to the casing of a VTR section through a rotatable shaft mechanism, the parts constituting the rotatable shaft mechanism have to have their size rigidly controlled, required to have high machining precision.

In this type of magnetic recording and reproducing device, a large number of wires are used for electrical connection between the monitor image section and the VTR section, it is very troublesome to package these wires during assembly of the video camera.

The video camera is of such construction that during its use metal fatigue is liable to take place as said wires repeatedly get entangled in or come into contact with peripheral parts each time the monitor image turns relative to the VTR section. And if the number of wires increases, they wind around themselves, detracting from their reliability.

DISCLOSURE OF THE INVENTION

Accordingly, an object of the invention is to provide a magnetic recording and reproducing device which can be constructed using parts requiring less strict machining tolerance and which allows improved wire packaging in assembling operation, said device including a rotatable shaft mechanism constructed such that there is less movement of wires for electrically connecting the monitor image section and the VTR section, thus providing improved reliability.

The present invention in one embodiment thereof is a magnetic recording and reproducing device wherein a second casing containing a monitor image section is supported for rotation relative to a first casing containing a VTR section, said device comprising a support shaft member centrally hollowed and fixed to the first casing, a rotatable member centrally hollowed and engaged with said support shaft member and fixed to the second casing, elastic members disposed between said support shaft member and said rotatable member to produce rotation load, wherein a wire for electrical connection between the VTR section and the monitor image section is packaged such that it is drawn from the second casing through the hollow portions of said rotatable member and support shaft member into the first casing; thus, a 1-axis rotatable shaft mechanism is formed.

With this arrangement of the invention, a 1-axis rotatable shaft mechanism for rotatably connecting a first casing containing a VTR section and a second casing containing a monitor image section can be realized using a rotatable shaft member and a rotatable member, which do not require strict dimensional accuracy, it being noted that said support shaft member and rotatable member may be in the form of inexpensive moldings.

Further, the support shaft member and rotatable member are centrally hollowed to allow the wire, which is used for electrical connection between the VTR section and the monitor image section, to be packaged such that it is drawn from the second casing through the hollow portions of the rotatable member and support shaft member into the first casing; therefore, there is no possibility of the wire being nipped during the operation of assembling the casings, thereby improving the operating efficiency and facilitating the packaging operation of the wire.

The invention in accordance with another embodiment, is a magnetic recording and reproducing device wherein a second casing containing a monitor image section is supported for rotation relative to a first casing containing a VTR section, said device comprising a support shaft member centrally hollowed and fixed to the first casing, a rotatable member centrally hollowed and engaged for rotation with said support shaft member and fixed to the second casing and having a connecting portion which projects in the direction to intersect the axis of said support shaft member and which engages the second casing, elastic members disposed between said support shaft member and said rotatable member to produce rotation load, wherein a wire for electrical connection between the VTR section and the monitor image section is packaged such that it is drawn from the second casing through the hollow portions of said rotatable member and support shaft member into the first casing; thus, a 2-axis rotatable shaft mechanism is formed.

According to a feature of the invention there is a magnetic recording and reproducing device, wherein the connecting portion of the rotatable member is provided with an elastic member which abuts against the inner wall of the second casing to produce a rotation load in the rotation of the second casing relative to the rotatable member.

In another feature of the invention as claimed there is a magnetic recording and reproducing device, as in the first or second embodiments, wherein the elastic members to produce a rotation load are composed of a shaft having a spherical front end, and a coil spring urging said shaft in the direction of the axis of of rotation of the rotatable member relative to the support shaft member to press said shaft against the rotatable member.

With this arrangement of the invention, a rotatable shaft mechanism is constructed using inexpensive moldings and simple springs. Further, by passing the wire through the center of the rotatable shaft, the movement of the wire relative to the monitor image section can be minimized, and there is no possibility of the wire being nipped during the operation of assembling the monitor image section and the monitor image section. Thus, the rotatable shaft mechanism is featured by improved operating efficiency and increased reliability.

DESCRIPTION OF EMBODIMENTS

An embodiment of the invention will now be described with reference to FIGS. 1 through 4.

In addition, to elucidate the subject of the invention, a conventional example will first be described with reference to FIG. 5.

Figure 5:
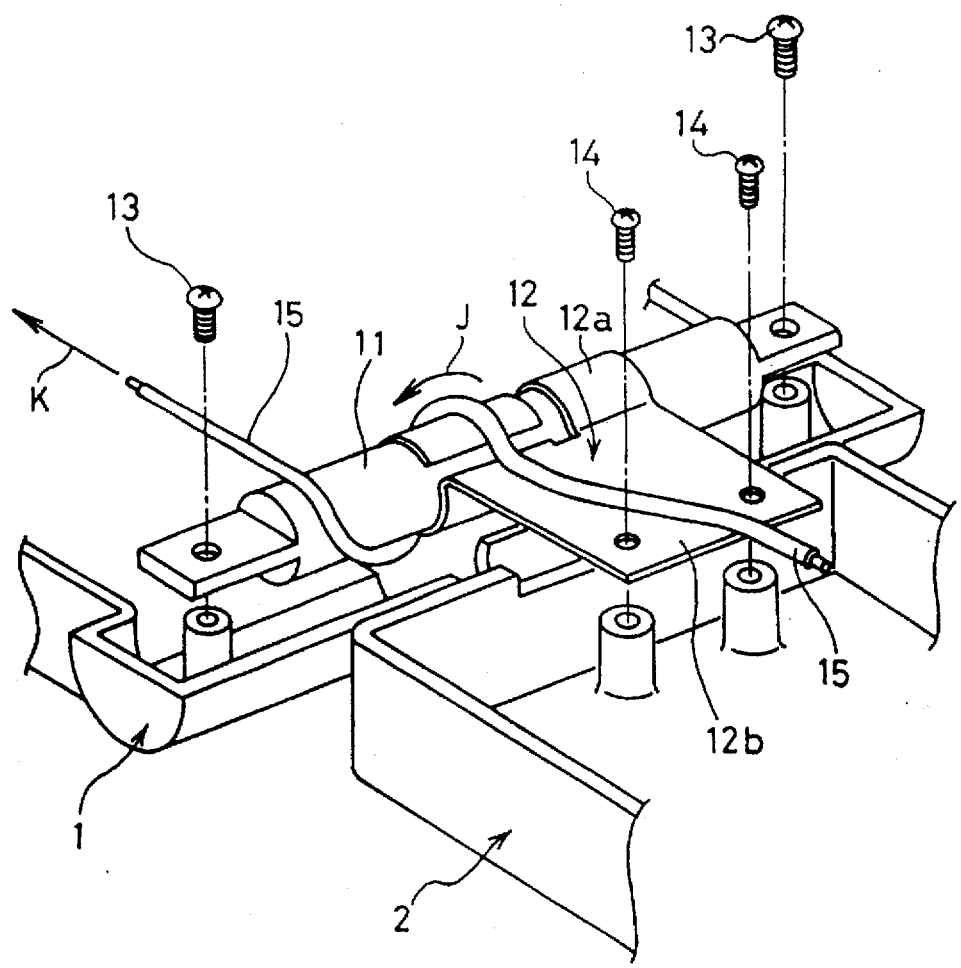
FIG. 5 is an exploded perspective view of the principal portion of a conventional magnetic recording and reproducing device.

A conventional video camera is constructed as shown in FIG. 5.

A first casing 1 containing a VTR section has a main shaft 11 fixed thereto by set screws 13. Fitted on the intermediate portion of said main shaft is a holder plate 12 formed at one end 12a thereof with a curling having an inner diameter slightly smaller than the outer diameter of the main shaft 11. Fixed on the other end 12b of said holder plate 12 by set screws 14 is a second casing 2 containing a monitor image section.

Therefore, the second casing 2 is turnable around the outer periphery of the main shaft 11 fixed to the first casing 1. In this conventional arrangement, to apply a suitable amount of load to the turning of the second casing 2 relative to the first casing 1, it is necessary to strictly control the respective sizes of the main shaft 11 and the holder plate 12, requiring high processing accuracy, which increases the cost of the parts.

Further, when a wire 15 is to be passed from the second casing 2 to the first casing 1 during assembling operation, it is passed around the main shaft 11 as indicated by arrows J and K. As a result, each time the second casing 2 is turned relative to the first casing 1, the wire 15 tends to wind around or comes in touch with the main shaft 11, until it exhibits metal fatigue, detracting from the reliability of the wire 15. When the number of wires 16 increases, they wind around themselves, further detracting from the reliability of the wires 15.

The wire 15 lying on the main shaft 11 as indicated by the arrow J will be nipped between the casings 1 and 2 when the first and second casings 1 and 2 are assembled, lowering the operating efficiency or reliability.

In contrast thereto, the magnetic recording and reproducing device of the present invention is arranged as follows.

Figure 1:
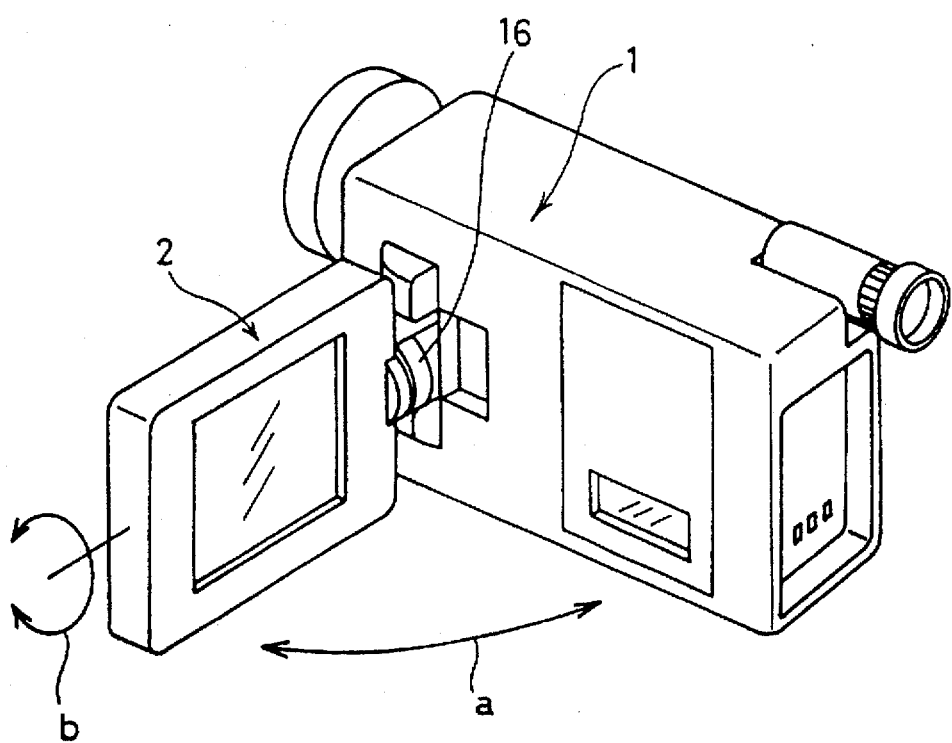
FIG. 1 is a perspective view showing a magnetic recording and reproducing device according to an embodiment of the invention.
Figure 3:
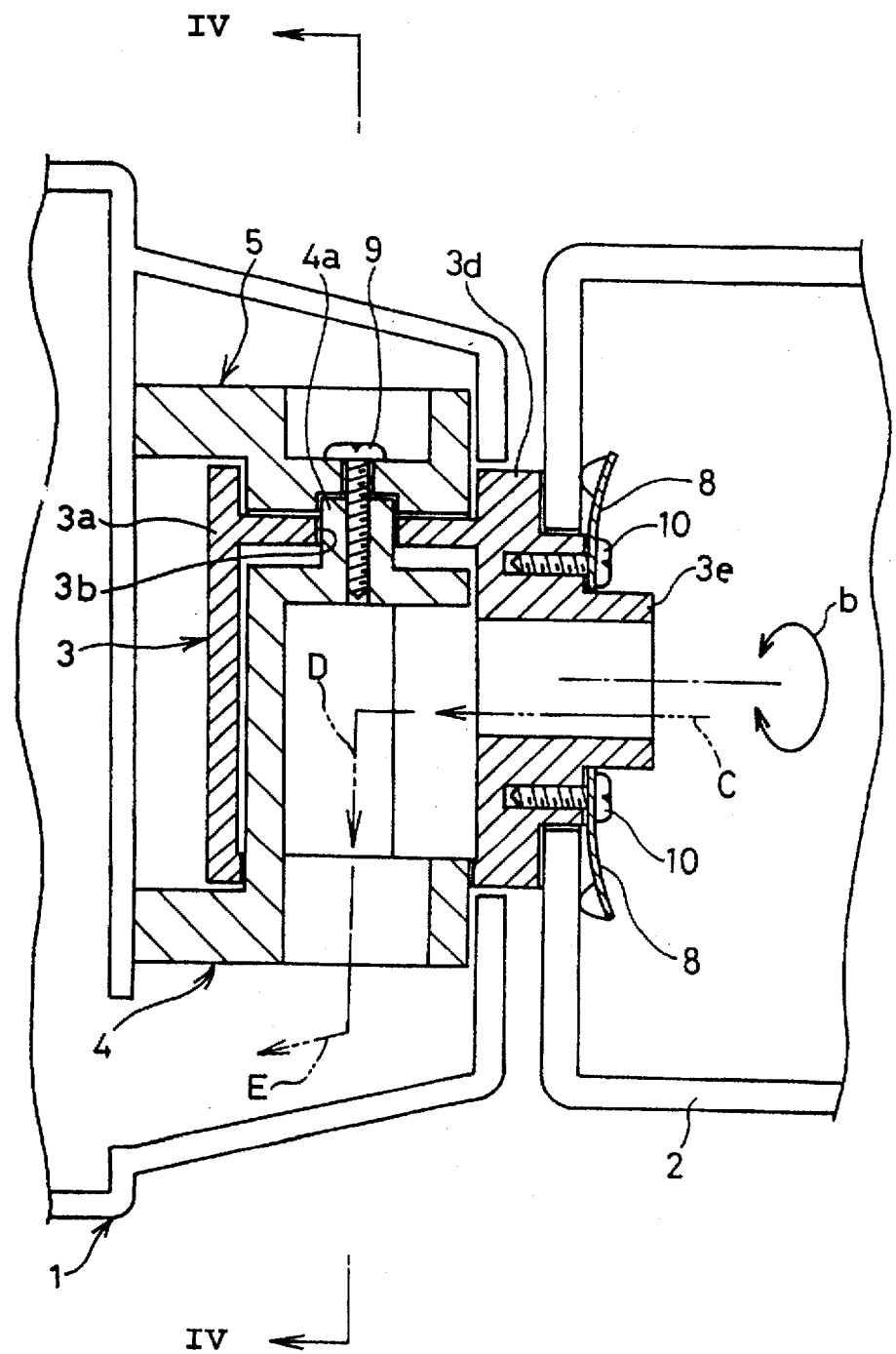
FIG. 3 is a sectional view taken along the line III—III in the rotatable shaft mechanism in FIG. 2, with a rotatable member 3 and a second casing 2 being turned counterclockwise through 90 degrees from the position shown in FIG. 2.

The magnetic recording and reproducing device of the invention, as shown in FIGS. 1 and 3, comprises a first casing containing a VTR section, and a second casing 2, disposed laterally of said first casing, containing a monitor image section, said second and first casings being connected through a rotatable shaft mechanism 18 which comprises a cylindrical rotatable member 3 attached to the second casing 2 and a support shaft member 4 attached to the first casing 1, the arrangement being such that the second casing 2 is rotatable relative to the first casing in the directions of arrows a and b.

Figure 4:
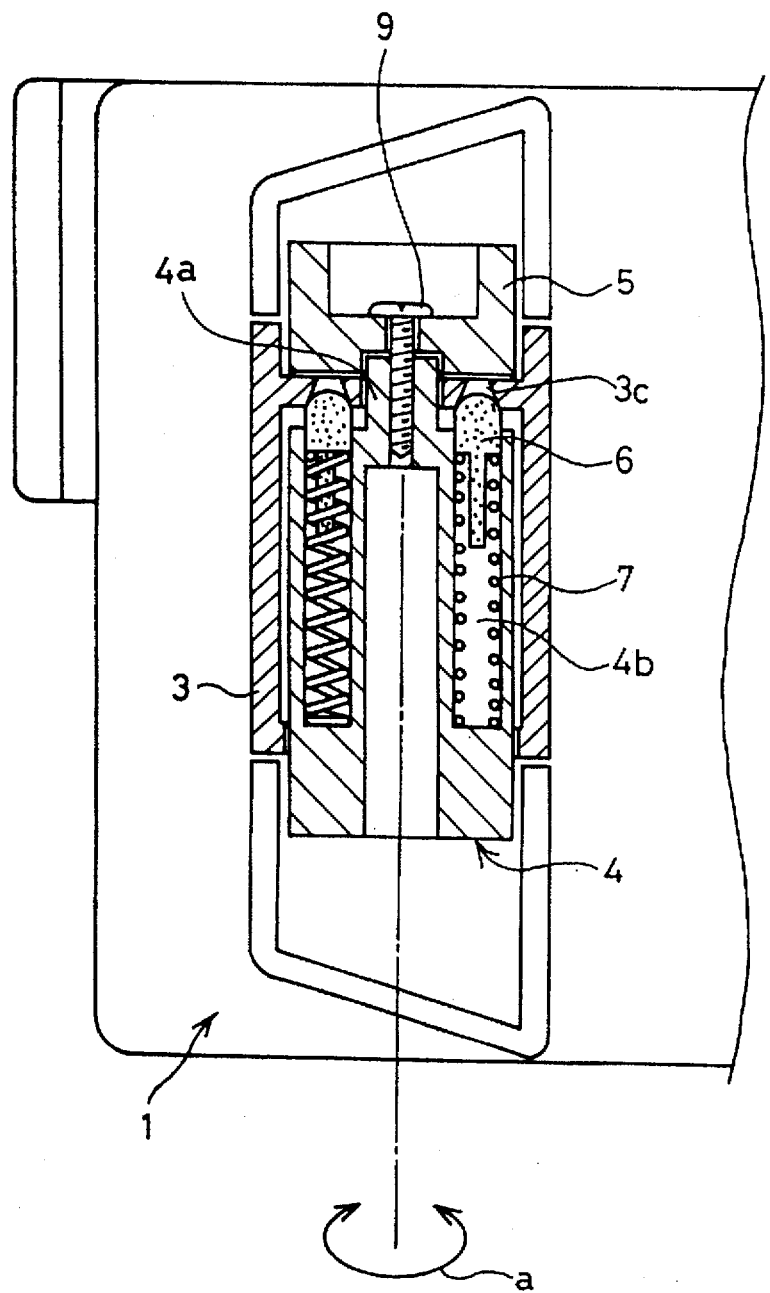
FIG. 4 is a sectional view taken along the line IV—IV in the rotatable shaft mechanism in FIG. 3, with the rotatable member 3 and the second casing 2 being turned counterclockwise through 90 degrees from the position shown in FIG. 2.

The rotatable shaft mechanism is arranged as shown in FIGS. 3 and 4.

The support shaft member 4 and the shaft member 5 of the rotatable shaft mechanism 16 are fixed to the first casing 1, and the rotatable member 3 of the rotatable shaft mechanism 16 is fitted on the outer periphery of the support shaft member 4. The wall 3a at one end of the rotatable member 3 is centrally formed with a hole 3b. A shaft portion 4a projecting from the center of the support shaft member 4 extends through said hole 3b and is fixed to the shaft member 5 by a set screw 9. Therefore, the rotatable member 3 is free to rotate in the direction of arrow a.

The wall 3a of the rotatable member 3 is formed with a plurality of holes 3c tapered at a predetermined angle, said holes 3c being disposed symmetrical with respect to the axis and on a circumference concentric with and outside the hole 3b.

The rotatable shaft member 4 also is formed with a pair of cylindrical holes 4b disposed on the same circumference as that for the taper holes 3c. Inserted in each of said cylindrical holes 4b are a coil spring 7 and a shaft 6 having a spherical front end, said shaft 6 being urged against the wall 3a of the rotatable member 3 by said coil spring 7.

The rotatable member 3 is formed with a hollow connecting portion 3d perpendicular to the central axis. A projection 3e formed on the front end of the connecting portion 3d extends through the hole 2a formed in the side wall of the second casing 2, and within the second casing 2, a holder member 8 is attached to the projection 3e by set screws 10.

Therefore, the second casing 2 is free to turn around the axis of the projection 3e in the direction of arrow b. Further, since the rotatable member 3 is turnable in the direction of arrow a, the second casing 2 is also turnable in the direction of arrow a.

Figure 2:
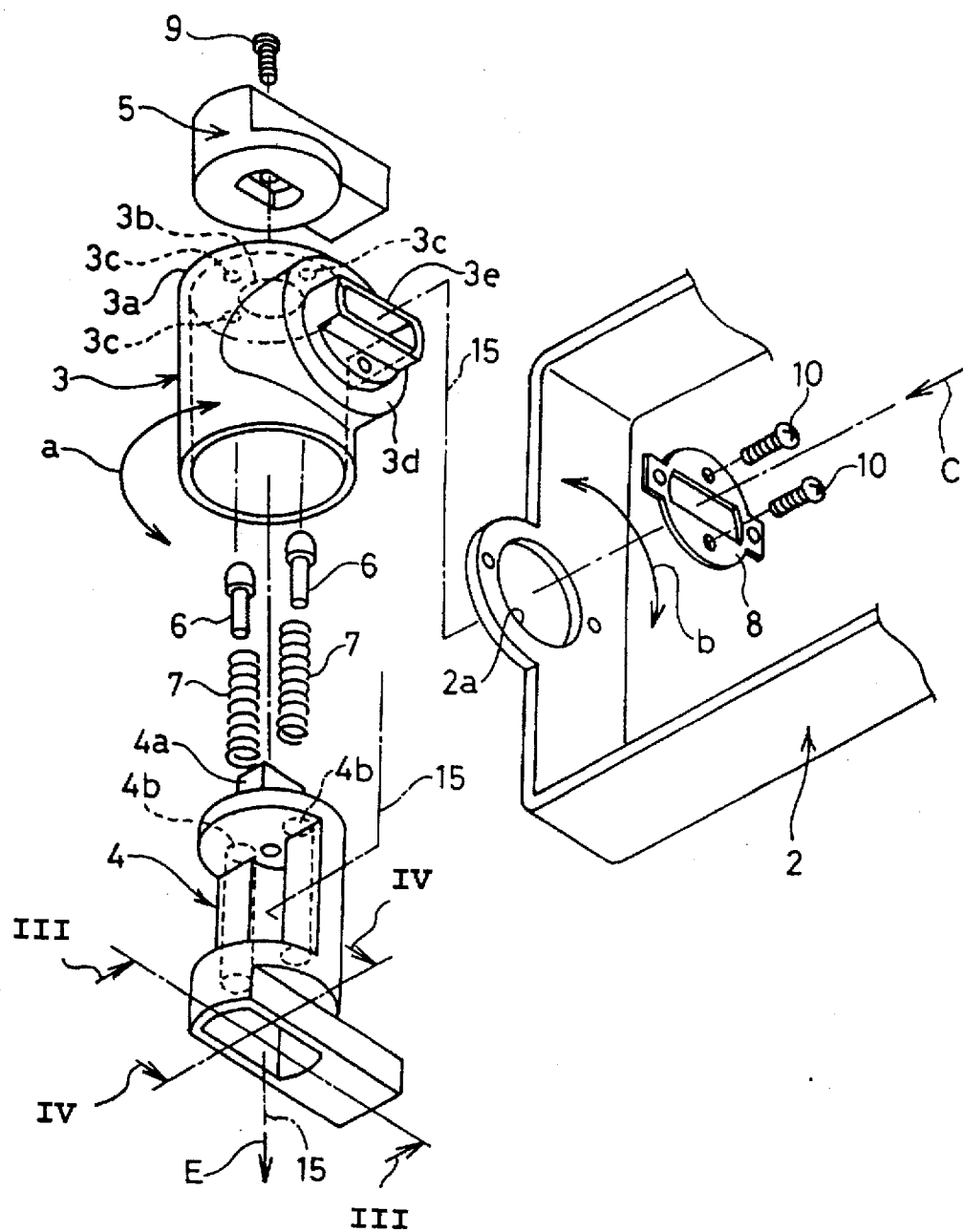
FIG. 2 is an exploded perspective view showing the internal arrangement of a rotatable shaft mechanism in said embodiment.

FIG. 3 shows the III—III section of the rotatable shaft member 4 of FIG. 2. The rotatable shaft member 4 is centrally hollowed as in the case of the rotatable member 4, said hollow portion leading to part of the outer periphery of the shaft and extending through the through-hole 3f of the projection 3e of the rotatable member 3 into the second housing 2. The wire 15 coming out of the second housing 2 extends in the direction of arrows C-D-E, through the through-hole 3f of the rotatable member 3 and the hollow portion of the rotatable shaft member 4 into the first housing 1, in which it is electrically connected to the electric circuit.

FIG. 4 shows the IV—IV section of the rotatable shaft member 4 of FIG. 2. When the second casing 2 is turned relative to the first casing 1 in the direction of arrow a, the shafts 6 being urged by the coil springs 7 are forced into the hole 3c of the rotatable member 3, so that the shafts 6 slide in the holes 4b of the rotatable shaft member 4, producing clicks in the rotation of the rotatable member 3. Therefore, the second casing 2 rotating as a unit with the rotary member 3 can be stopped once at a predetermined angle.

Thus, the present invention realizes a 2-axis rotatable shaft mechanism using a rotatable shaft member 4 and a rotatable member 3, which do not require strict dimensional accuracy, and coil springs 7 and shafts 6, wherein the rotatable member 3 is rotatable relative to the support shaft member 4 attached to the first casing and the second casing 2 is rotatable relative to the rotatable member 3, it being noted that said support shaft member 4 and rotatable member 3 may be in the form of inexpensive moldings.

Further, the support shaft member 4 and rotatable member 3 are centrally hollowed to allow the wire 15, which is used for electrical connection between the VTR section and the monitor image section, to be packaged such that it is drawn from the second casing 2 through the hollow portions of the rotatable member 3 and support shaft member 4 into the first casing 1; thus, there is no possibility of the wire 15 being nipped between the first and second casings 1 and 2 during the operation of assembling the first and second casings, thereby improving the operating efficiency and facilitating the packaging operation of the wire 15.

Furthermore, since the wire 15 is passed in the vicinity of the center of the shaft, even if the second casing is repeatedly turned relative to the first casing 1, there is no possibility of the wire 15 being repeatedly wound around or coming in contact with peripheral parts, resulting in less metal fatigue of the wire 15 and increased reliability of the wire 15.

In addition, the above embodiment refers to 2-axis rotatable shaft mechanism; however, it is possible to likewise construct a 1-axis rotatable shaft mechanism wherein the rotatable member 3 is integrated with the second casing 2. In the case of such 1-axis rotatable shaft mechanism also, the wire 15 will be packaged such that it is dawn through the hollow portions of the rotatable member 3 and support shaft member 4 into the first casing 1.

What is claimed is:

1. A magnetic recording and reproducing device wherein a second casing containing a monitor image section is supported for rotation relative to a first casing containing a VTR section, said device comprising a support shaft member centrally hollowed and fixed to the first casing, a rotatable member centrally hollowed and engaged with said support shaft member and fixed to the second casing, elastic members disposed between said support shaft member and said rotatable member to produce rotation load, wherein a wire for electrical connection between the VTR section and the monitor image section is packaged such that it is drawn from the second casing through the hollow portions of said rotatable member and support shaft member into the first casing.

2. A magnetic recording and reproducing device wherein a second casing containing a monitor image section is supported for rotation relative to a first casing containing a VTR section, said device comprising a support shaft member centrally hollowed and fixed to the first casing, a rotatable member centrally hollowed and engaged for rotation with said support shaft member and fixed to the second casing and having a connecting portion which projects in the direction to intersect the axis of said support shaft member and which engages the second casing, elastic members disposed between said support shaft member and said rotatable member to produce rotation load, wherein a wire for electrical connection between the VTR section and the monitor image section is packaged such that it is drawn from the second casing through the hollow portions of said rotatable member and support shaft member into the first casing.

3. A magnetic recording and reproducing device as set forth in claim 2, wherein the connecting portion of the rotatable member is provided with an elastic member which abuts against the inner wall of the second casing to produce a rotation load in the rotation of the second casing relative to the rotatable member.

4. A magnetic recording and reproducing device as set forth in claims 1 or 2, wherein the elastic members to produce a rotation load are composed of a shaft having a spherical front end, and a coil spring urging said shaft in the direction of the axis of rotation of the rotatable member relative to the support shaft member to press said shaft against the rotatable member.

5. A magnetic recording and reproducing device as set forth in claim 2, wherein the elastic members to produce a rotation load are composed of a shaft having a spherical front end, and a coil spring urging said shaft in the direction of the axis of rotation of the rotatable member relative to the support shaft member to press said shaft against the rotatable member.

* * * * *

UNITED STATES PATENT AND TRADEMARK OFFICE
CERTIFICATE OF CORRECTION

PATENT NO. : 5,738,321
DATED : April 14, 1998
INVENTOR(S) : Yoshitada MORIYASU

It is certified that error appears in the above-indentified patent and that said Letters Patent is hereby corrected as shown below:

In Column 6, line 20, change "claims 1 or 2" to --claim 1--.

Signed and Sealed this

Third Day of November, 1998

*Attest:*

BRUCE LEHMAN

*Attesting Officer*     *Commissioner of Patents and Trademarks*